United States Patent
Lam et al.

(10) Patent No.: US 9,369,569 B1
(45) Date of Patent: Jun. 14, 2016

(54) END-TO-END VOICE-OVER-LONG TERM EVOLUTION (VOLTE) CALL RECORD

(71) Applicant: Verizon Patent and Licensing Inc., Arlington, VA (US)

(72) Inventors: Maria G. Lam, Oakland, CA (US); Parry Cornell Booker, Arlington, TX (US); Imtiaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/670,659

(22) Filed: Mar. 27, 2015

(51) Int. Cl.
*H04M 3/22* (2006.01)
*H04M 15/00* (2006.01)

(52) U.S. Cl.
CPC .......... *H04M 3/2218* (2013.01); *H04M 3/2227* (2013.01); *H04M 15/41* (2013.01)

(58) Field of Classification Search
None
See application file for complete search history.

(56) References Cited

U.S. PATENT DOCUMENTS

| | | | | |
|---|---|---|---|---|
| 6,405,027 B1* | 6/2002 | Bell | ...................... | H04M 1/725 455/403 |
| 7,583,794 B1* | 9/2009 | Croak | .................. | H04M 15/00 379/126 |
| 8,811,187 B2* | 8/2014 | Macias | ................. | H04W 48/18 370/241 |
| 9,131,429 B1* | 9/2015 | Bharadwaj | .......... | H04W 76/025 |
| 2011/0007706 A1* | 1/2011 | Shaikh | .................. | H04W 28/16 370/331 |
| 2012/0281685 A1* | 11/2012 | Kotecha | ................ | H04W 76/04 370/338 |
| 2013/0017805 A1* | 1/2013 | Andre--Jonsson | | H04W 36/0066 455/411 |
| 2014/0064210 A1* | 3/2014 | Anchan | ................. | H04W 72/08 370/329 |
| 2014/0071889 A1* | 3/2014 | Aksu | ................. | H04L 29/06278 370/328 |

* cited by examiner

*Primary Examiner* — Ashish K Thomas

(57) ABSTRACT

A device receives information associated with a voice-over-long term evolution (VoLTE) call from multiple network devices that handle the VoLTE call and that are provided in an evolved packet system (EPS). The device identifies particular parameters from the information associated with the VoLTE call, and combines the particular parameters into an end-to-end call record for the VoLTE call. The device outputs or stores the end-to-end call record for the VoLTE call.

20 Claims, 10 Drawing Sheets

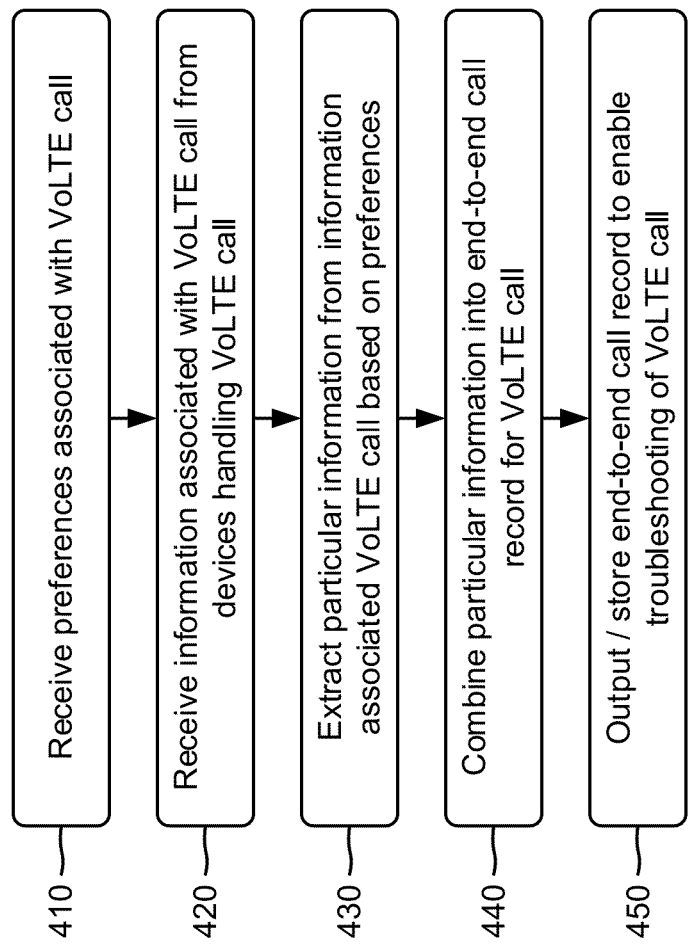

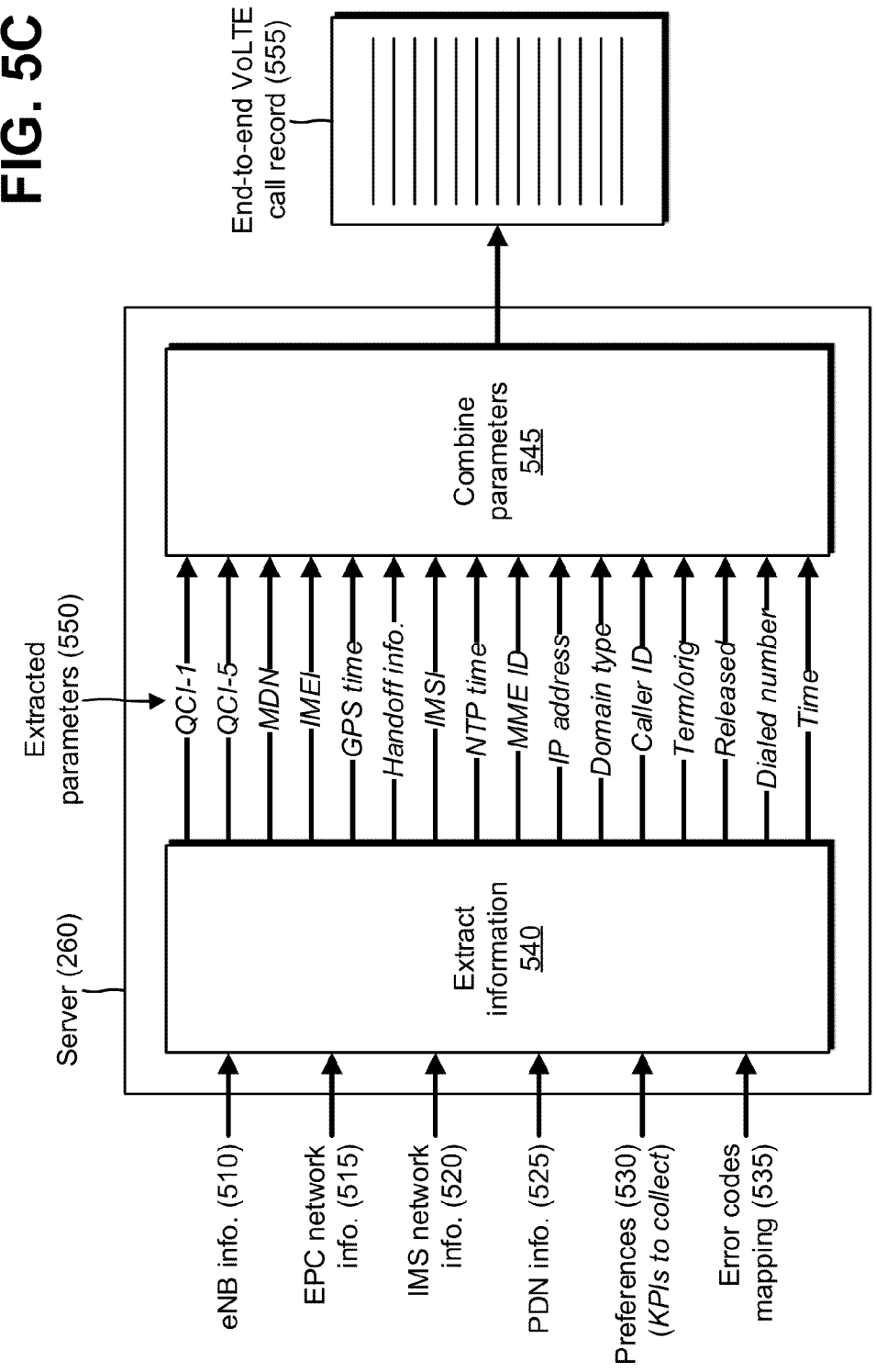

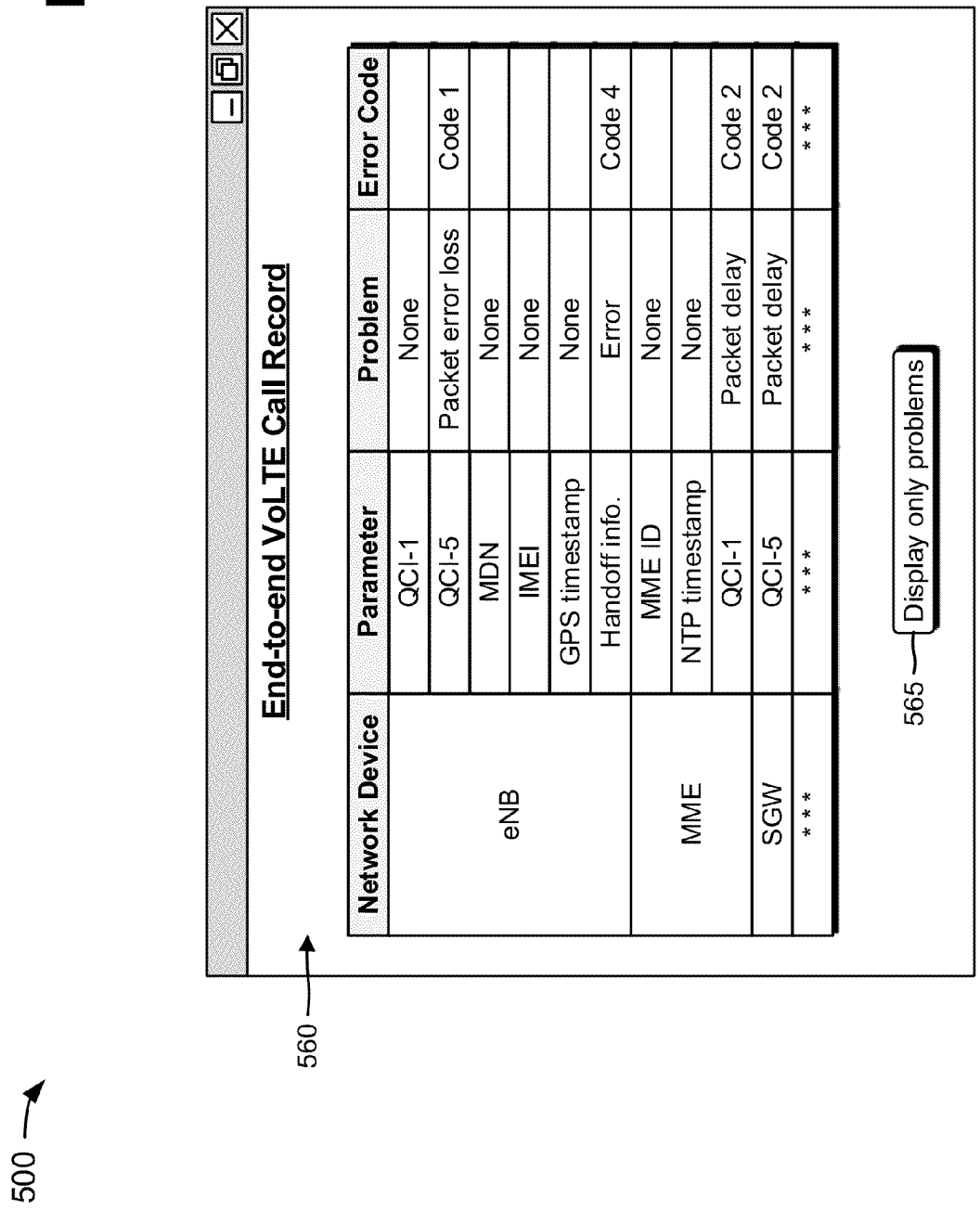

END-TO-END VOICE-OVER-LONG TERM EVOLUTION (VOLTE) CALL RECORD

BACKGROUND

In the Third Generation Partnership Project (3GPP), the fourth generation (4G) cellular network includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network is often called an evolved universal terrestrial radio access network (E-UTRAN). The EPC network is an all-IP packet-switched core network that supports high-speed wireless and wireline broadband access technologies. The EPC network allows user equipment (UEs) to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching.

Voice-over-LTE (VoLTE) is a service provided by the LTE network and is based on the IMS network. VoLTE provides specific profiles for control and media planes of a voice service on the LTE network. VoLTE delivers the voice service (e.g., the control and media planes) as data flows within a LTE data bearer. Therefore, VoLTE does not depend on and eliminates a need for a legacy circuit-switched voice network.

BRIEF DESCRIPTION OF THE DRAWINGS

FIG. 4 is a flow chart of an example process for receiving information associated with a VoLTE call and creating an end-to-end VoLTE call record based on the information; and FIGS. 5A-5F are diagrams of an example relating to the example process shown in FIG. 4.

DETAILED DESCRIPTION OF PREFERRED EMBODIMENTS

The following detailed description refers to the accompanying drawings. The same reference numbers in different drawings may identify the same or similar elements.

When a VoLTE video and/or voice call is placed by user equipment (UE), the VoLTE call is processed by various network devices of the LTE network, the EPC network, the IMS network, and the packet data network. While the VoLTE call is being processed, each of the network devices may generate information (e.g., key performance indicators (KPIs), parameters, or the like) that provides an indication of the performance of each of the network devices. The performance information may enable troubleshooting of each individual network device for the VoLTE call, but may not enable end-to-end troubleshooting of the VoLTE call across multiple network devices. Furthermore, different network devices may be manufactured by different vendors, and the performance information from one network device may not correlate with the performance information from another network device.

Systems and/or methods, described herein, may collect performance information, associated with a VoLTE call, from network devices of a LTE network, an EPC network, an IMS network, and/or a packet data network that process the VoLTE call, and may generate an end-to-end VoLTE call record based on the performance information. The systems and/or methods may extract particular parameters from the performance information, and may create the end-to-end VoLTE call record based on the particular parameters. The systems and/or methods may correlate, in the end-to-end VoLTE call record, performance information from network devices even when the network devices are manufactured by different vendors. The systems and/or methods may provide a unified end-to-end view of the VoLTE call that permits quick and easy troubleshooting of the entire VoLTE call and reduces the time and expense associated with troubleshooting.

Figure 1:
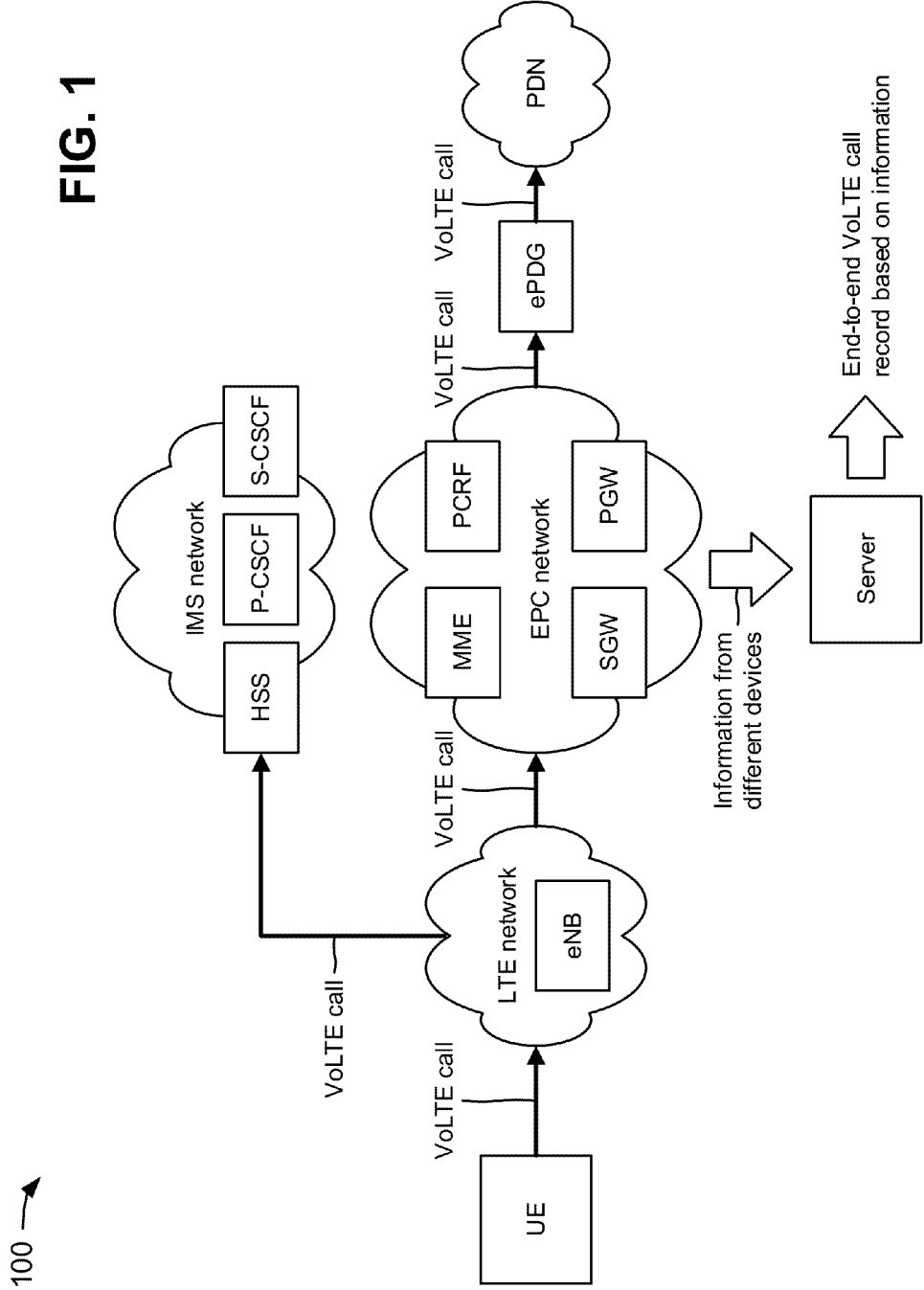
FIG. 1 is a diagram of an overview of an example implementation described herein.

FIG. 1 is a diagram of an overview of an example implementation 100 described herein. As shown, a UE may connect to a LTE network, an EPC network, an IMS network, and a packet data network (PDN). The LTE network may include a base station (e.g., an eNodeB or eNB). The EPC network may include a mobility management entity (MME), a serving gateway (SGW), a policy and charging rules function (PCRF) server, and a PDN gateway (PGW). The IMS network may include a home subscriber server (HSS), a proxy call session control function (P-CSCF) server, and a serving call session control function (S-CSCF) server. The PDN may be associated with an evolved packet data gateway (ePDG). The UE may include an application that enables the UE to establish and conduct a VoLTE call (or session) via one or more devices of the LTE network, the EPC network, the IMS network, and/or the PDN. In some implementations, the VoLTE call may include mobile (UE) to land (e.g., public switched telephone network (PSTN)) call or a land to mobile call.

As further shown in FIG. 1, the UE may establish and conduct the VoLTE call via one or more devices of the LTE network, the EPC network, the IMS network, and/or the PDN. For example, the UE may establish and conduct the VoLTE call via the eNB, the MME, the SGW, the PCRF, the PGW, the HSS, the P-CSCF, the S-CSCF, and/or the ePDG. While the VoLTE call is established and/or conducted, the eNB, the MME, the SGW, the PCRF, the PGW, the HSS, the P-CSCF, the S-CSCF, and/or the ePDG may generate information associated with the VoLTE call. As further shown in FIG. 1, a server may receive the information associated with the VoLTE call, and may extract particular information (e.g., key performance indicators (KPIs), parameters, or the like) from the information associated with the VoLTE call. The server may combine the particular information into an end-to-end call record for the VoLTE call, and may output and/or store the end-to-end VoLTE call record. The end-to-end VoLTE call record may enable troubleshooting of the VoLTE call and/or the devices handling the VoLTE call.

Systems and/or methods, described herein, may provide a unified end-to-end VoLTE call record that permits quick and easy troubleshooting of devices that handle the entire VoLTE call and reduces the time and expense associated with such troubleshooting.

Figure 2:
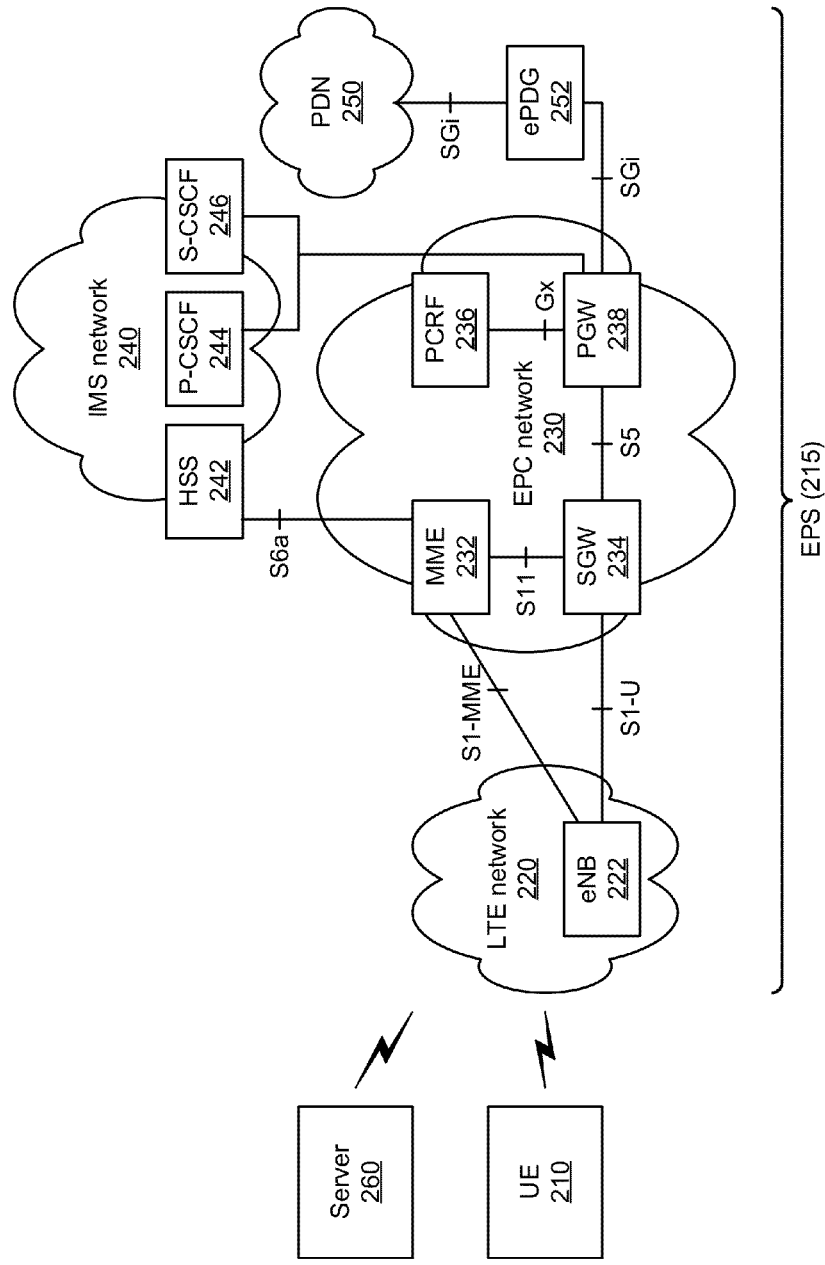
FIG. 2 is a diagram of an example environment in which systems and/or methods, described herein, may be implemented.

FIG. 2 is a diagram of an example environment 200 in which systems and/or methods, described herein, may be implemented. As illustrated, environment 200 may include a UE 210; an EPS 215 that includes a LTE network 220, an EPC network 230, an IMS network 240, and a PDN 250; and a server 260. LTE network 220 may include an eNodeB (eNB)

222. EPC network 230 may include a mobility management entity (MME) 232, a serving gateway (SGW) 234, a policy and charging rules function (PCRF) server 236, and a PDN gateway (PGW) 238. IMS network 240 may include a home subscriber server (HSS) 242, a proxy call session control function (P-CSCF) server 244, and a serving call session control function (S-CSCF) server 246. PDN 250 may be associated with an ePDG 252. Devices/networks of environment 200 may connect via wired connections, wireless connections, or a combination of wired and wireless connections.

As further shown in FIG. 2, eNB 222 may connect with MME 232 over a S1-MME interface, and may connect with SGW 234 over a S1-U interface. MME 232 may connect with SGW 234 over a S11 interface, and may connect with HSS 242 over a S6a interface. SGW 234 may connect with PGW 238 over a S5 interface. PCRF 236 may connect with PGW 238 over a Gx interface. PGW 238 may connect with ePDG 252 over a SGi interface, and may connect with P-CSCF 244 and S-CSCF 246. PDN 250 may connect with ePDG 252 over a SGi interface. Other connections, not shown in FIG. 2, may also be utilized within EPS 215. For example, multiple MMEs 232 may connect with one another over S10 interfaces.

UE 210 may include a device that is capable of communicating over LTE network 220, EPC network 230, and/or IMS network 240. In some implementations, UE 210 may include a radiotelephone; a personal communications services (PCS) terminal that may combine, for example, a cellular radiotelephone with data processing and data communications capabilities; a smart phone; a television; a laptop computer; a tablet computer; a global positioning system (GPS) device; a gaming device; a set-top box (STB); or another type of computation and communication device.

EPS 215 is a core network architecture of the 3GPP LTE wireless communication standard. EPS 215 may include LTE network 220, EPC network 230, IMS network 240, and PDN 250.

LTE network 220 may include a communications network that connects users (e.g., UE 210) to a service provider network. In some implementations, LTE network 220 may include a wireless local area network (WLAN) or another type of access network (e.g., an E-UTRAN or an eHRPD network). In some implementations, LTE network 220 may include a radio access network capable of providing a particular data rate, a particular latency, packet optimization, a particular capacity and coverage, or the like.

eNB 222 may include one or more computation and communication devices, such as a base station, that receive traffic from MME 232 and/or SGW 234 and transmit that traffic to UE 210. eNB 222 may also include one or more devices that receive traffic from UE 210 and transmit that traffic to MME 232 and/or SGW 234 or to other UEs 210. eNB 222 may combine the functionalities of a base station and a radio network controller (RNC) in 2G or 3G radio access networks.

EPC network 230 may include an IP packet-switched core network that supports high-speed wireless and wireline broadband access technologies. In some implementations, EPC network 230 may provide packet-switched voice and/or video services (e.g., which are traditionally circuit-switched) using IMS network 240 and PDN 250.

MME 232 may include one or more computation and communication devices that may be responsible for idle mode tracking and paging procedures (e.g., including retransmissions) for UE 210. MME 232 may be involved in a bearer activation/deactivation process (e.g., for UE 210) and may choose a SGW for UE 210 at an initial attachment and at a time of intra-LTE handover. In some implementations, MME 232 may authenticate UE 210. Non-access stratum (NAS) signaling may terminate at MME 232, and MME 232 may generate and allocate temporary identities to UEs 210. MME 232 may check authorization of UE 210 to utilize LTE network 220 and may enforce roaming restrictions for UE 210. MME 232 may be a termination point in EPC network 230 for ciphering/integrity protection for NAS signaling and may handle security key management. MME 232 may provide a control plane function for mobility between LTE network 220 and other access networks with a S3 interface terminating at MME 232.

SGW 234 may include one or more devices that route and forward user data packets, may act as a mobility anchor for a user plane during inter-eNB handovers, and may act as an anchor for mobility between LTE and other 3GPP technologies. For idle state UEs 210, SGW 234 may terminate a downlink data path and may trigger paging when downlink data arrives for UE 210. SGW 234 may manage and store contexts associated with UE 210 (e.g., parameters of an IP bearer service, network internal routing information, or the like). In some implementations, SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic.

PCRF 236 may include one or more computation and communication devices that provide policy control decision and flow based charging control functionalities. PCRF 236 may provide network control regarding service data flow detection, gating, QoS and flow based charging, or the like. In some implementations, PCRF 236 may determine how a certain service data flow is to be treated, and may ensure that user plane traffic mapping and treatment is in accordance with a user's subscription profile.

PGW 238 may include one or more devices that provide connectivity of UE 210 to external PDNs (e.g., PDN 250) by being a traffic exit/entry point for UE 210. UE 210 may simultaneously connect to more than one PGW 238 for accessing multiple PDNs. PGW 238 may perform policy enforcement, packet filtering for each user, charging support, lawful intercept, and packet screening. PGW 238 may also act as an anchor for mobility between 3GPP and non-3GPP technologies. In some implementations, PGW 238 may include one or more traffic transfer devices (or network devices), such as a gateway, a router, a switch, a firewall, a NIC, a hub, a bridge, a proxy server, an OADM, or some other type of device that processes and/or transfers traffic.

IMS network 240 may include an architectural framework or network (e.g., a telecommunications network) for delivering IP multimedia services. In some implementations, IMS network 240 may include a standardized reference architecture that provides session control, a connection control and an applications services framework, and user and services data.

HSS 242 may include one or more computation and communication devices that provide a master user database that supports devices of IMS network 240 that handle calls. HSS 242 may contain subscription-related information (e.g., user profiles), may perform authentication and authorization of a user, and may provide information about a user's location and IP information.

P-CSCF 244 may include one or more computation and communication devices that function as a proxy server for UE 210, where session initiation protocol (SIP) signaling traffic to and from UE 210 may go through P-CSCF 244. In some implementations, P-CSCF 244 may validate and then forward requests from UE 210, and may process and forward responses to UE 210.

S-CSCF 246 may include one or more computation and communication devices that function as a central node of a signaling plane, and perform session control. In some implementations, S-CSCF 246 may handle SIP registrations in order to bind a user location (e.g., an IP address of UE 210) and a SIP address, and may inspect a path of all signaling messages of locally registered users. In some implementations, S-CSCF 246 may decide to which application server(s) a SIP message may be forwarded in order to receive services of the application server(s), may provide routing services (e.g., using electronic numbering (ENUM) lookups), and may enforce a policy of a network operator.

PDN 250 may include one or more data communications networks that are based on packet switching, as opposed to circuit switching that is used in public telephone networks. In some implementations, PDN 250 may be capable of communicating with UE 210 over IMS network 240.

ePDG 252 may include one or more computation and communication devices that provide secure data transmission with UE 210 when UE 210 connects to EPC network 230 over an untrusted non-3GPP access network. In some implementations, ePDG 252 may act as a termination node for IP security (IPsec) tunnels established with UE 210. In some implementations, ePDG 252 may include one or more traffic transfer devices (or network devices), such as a gateway, a router, a switch, a firewall, a NIC, a hub, a bridge, a proxy server, an OADM, or some other type of device that processes and/or transfers traffic.

Server 260 may include one or more personal computers, one or more workstation computers, one or more server devices, one or more virtual machines (VMs) provided in a cloud computing environment, and/or one or more other types of computation and communication devices. In some implementations, server 260 may be associated with an entity that manages and/or operates one or more portions of environment 200, such as, for example, a telecommunication service provider, a television service provider, an Internet service provider, or the like. In some implementations, server 260 may receive information associated with a VoLTE call from devices (e.g., eNB 222, MME 232, SGW 234, PCRF 236, PGW 238, HSS 242, P-CSCF 244, S-CSCF 246, and/or ePDG 252) handling the VoLTE call. In some implementations, a device may be provided in environment 200 to detect the information associated with the VoLTE call, and to provide the information to server 260. In some implementations, server 260 may extract or identify particular information from the information associated with the VoLTE call, and may combine the particular information into an end-to-end call record for the VoLTE call. In some implementations, server 260 may output and/or store the end-to-end VoLTE call record to enable troubleshooting of the VoLTE call.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
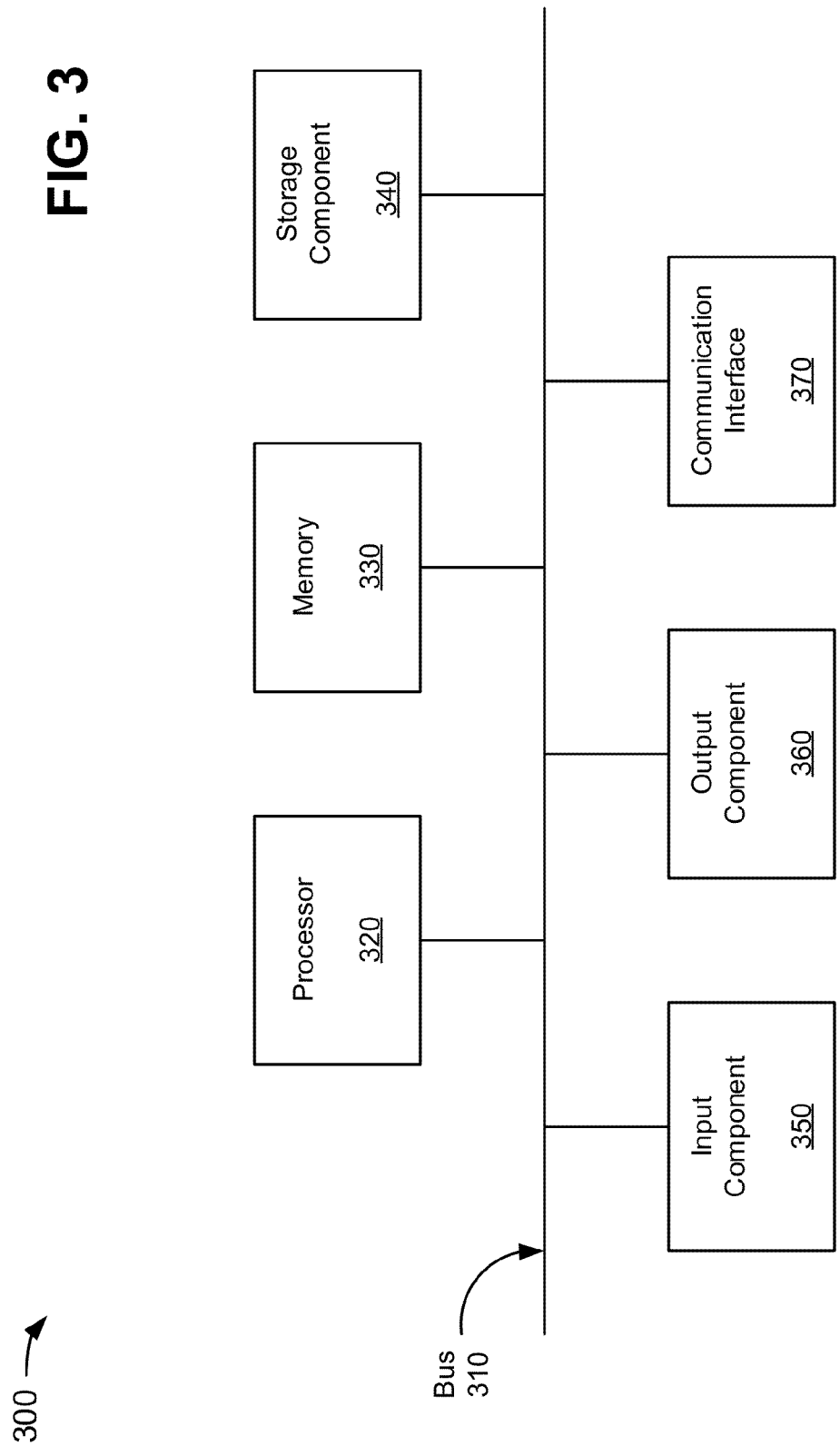
FIG. 3 is a diagram of example components of a device that may correspond to one or more of the devices of the environment depicted in FIG. 2.

FIG. 3 is a diagram of example components of a device 300. Device 300 may correspond to UE 210, eNB 222, MME 232, SGW 234, PCRF 236, PGW 238, HSS 242, P-CSCF 244, S-CSCF 246, ePDG 252, and/or server 260. In some implementations, UE 210, eNB 222, MME 232, SGW 234, PCRF 236, PGW 238, HSS 242, P-CSCF 244, S-CSCF 246, ePDG 252, and/or server 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. In some implementations, processor 320 may include a processor (e.g., a central processing unit (CPU), a graphics processing unit (GPU), an accelerated processing unit (APU), or the like), a microprocessor, and/or any processing component (e.g., a field-programmable gate array (FPGA), an application-specific integrated circuit (ASIC), or the like) that interprets and/or executes instructions. Memory 330 may include a random access memory (RAM), a read only memory (ROM), and/or another type of dynamic or static storage device (e.g., a flash memory, a magnetic memory, an optical memory, or the like) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, or the like). Additionally, or alternatively, input component 350 may include a sensor for sensing information (e.g., a global positioning system (GPS) component, an accelerometer, a gyroscope, an actuator, or the like). Output component 360 may include a component that provides output information from device 300 (e.g., a display, a speaker, one or more light-emitting diodes (LEDs), or the like).

Communication interface 370 may include a transceiver-like component (e.g., a transceiver, a separate receiver and transmitter, or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for receiving information associated with a VoLTE call and creating an end-to-end VoLTE call record based on the information. In some implementations, one or more process blocks of FIG. 4 may be performed by server 260. In some implementations, one or more process blocks of FIG. 4 may be performed by another device or a group of devices separate from or including server 260.

As shown in FIG. 4, process 400 may include receiving preferences associated with a VoLTE call (block 410). For example, a user may provide preferences associated with a VoLTE voice and/or video call to server 260, and server 260 may receive the preferences. In some implementations, server 260 may enable the user to set preferences for receiving information (e.g., call setup information, three-way conference call setup information, quality of service (QoS) information, call mobility information, call termination (end or drop) information, or the like) associated with a VoLTE call. In some implementations, the user may access server 260 via, for example, a user interface (such as a browser) provided by server 260, or in another manner. The user may then select, using the user interface, the preferences for receiving information associated with the VoLTE call.

In some implementations, the preferences may include particular information from the generated eNB information, EPC network information, IMS network information, and PDN information. In some implementations, the preferences may indicate that the following VoLTE call information is to be received from eNB 222: a QoS class indicator-1 (QCI-1) (e.g., which provides a priority, a packet delay budget, a packet error loss rate, a guaranteed bit rate (GBR), a maximum bit rate (MBR), or the like for a voice call); a QCI-5 (e.g., which provides a priority, a packet delay budget, a packet error loss rate, a GBR, a MBR, or the like for IMS signaling); a QCI-6 or other QCIs (e.g., which provides a priority, a packet delay budget, a packet error loss rate, a GBR, a MBR, or the like for video); a mobile directory number (MDN); an international mobile station equipment identity (IMEI); a GPS-based timestamp; handoff information; or the like.

In some implementations, the preferences may indicate that the following VoLTE call information is to be received from one or more devices of EPC network 230 (e.g., MME 232, SGW 234, PCRF 236, and/or PGW 238): a QCI-1; a QCI-5; a QCI-6; an international mobile subscriber identity (IMSI); a MDN; an IMEI; a network time protocol (NTP)-based timestamp; handoff information; an identifier (ID) associated with MME 232; or the like.

In some implementations, the preferences may indicate that the following VoLTE call information is to be received from one or more devices of IMS network 240 (e.g., HSS 242, P-CSCF 244, and/or S-CSCF 246): an IP address; an IMSI; a domain type (e.g., com, info, net, edu, or the like); a caller identification (ID) number; identification of a terminating UE for the VoLTE call; identification of an originating UE for the VoLTE call; information indicating whether the VoLTE call is released by UE 210 or IMS network 240; a dialed number; or the like.

In some implementations, the preferences may indicate that the following VoLTE call information is to be received from PDN 250 and/or ePDG 252: information associated with a radio resource control (RRC) connection request and setup; information associated with a PDN connectivity attach request (e.g., protocol configuration options, a request for an address of P-CSCF 244, or the like); or the like. In some implementations, the preferences may indicate that a start time and a release time associated with each device that handles the VoLTE call is to be received by server 260. In some implementations, server 260 may receive and/or store an error codes mapping that provides an error code per device (e.g., of environment 200) mapping. For example, the error codes mapping may include a list of codes that map to errors occurring in environment 200 during the VoLTE call.

Alternatively, or additionally, a type of the account, of the user, associated with server 260 may determine the quantity of preferences that the user is able to specify. For example, server 260 may enable the user to specify only a subset of the above preferences or specify additional preferences based on the type of the account with which the user is associated.

As further shown in FIG. 4, process 400 may include receiving information associated with the VoLTE call from devices handling the VoLTE call (block 420). For example, server 260 may receive information associated with the VoLTE call from devices of environment 200 that handle the VoLTE call. In some implementations, UE 210 may utilize EPS 215 to establish and maintain the VoLTE call with another UE. One or more devices of EPS 215 may generate information based on the establishment and maintenance of the VoLTE call for UE 210. For example, eNB 222 may generate eNB information (e.g., call setup information, three-way conference call setup, or the like); devices of EPC network 230 (e.g., MME 232, SGW 234, PCRF 236, and/or PGW 238) may generate EPC network information (e.g., call setup information, three-way conference call setup information, QoS information, call mobility information, or the like); devices of IMS network 240 (e.g., HSS 242, P-CSCF 244, and/or S-CSCF 246) may generate IMS network information (e.g., call setup information, three-way conference call setup information, QoS information, call mobility information, or the like); and/or PDN 250 and/or ePDG 252 may generate PDN information (e.g., protocol configuration options, connectivity information, or the like).

In some implementations, each of the devices of environment 200 may be programmed and/or instructed to send particular information to server 260. For example, eNB 222 may be instructed to provide the eNB information to server 260; MME 232, SGW 234, PCRF 236, and/or PGW 238 may be instructed to provide the EPC network information to server 260; HSS 242, P-CSCF 244, and/or S-CSCF 246 may be instructed to provide the IMS network information to server 260; and ePDG 252 may be instructed to provide the PDN information to server 260.

In some implementations, server 260 may receive the eNB information, the EPC network information, the IMS network information, and/or the PDN information. In some implementations, server 260 may store the eNB information, the EPC network information, the IMS network information, and/or the PDN information (e.g., in memory 330 and/or storage component 340, FIG. 3).

As further shown in FIG. 4, process 400 may include extracting particular information from the information associated with the VoLTE call based on the preferences (block 430). For example, server 260 may extract or identify particular information from the information associated with the VoLTE call based on the received preferences. In some implementations, server 260 may extract a QCI-1, a QCI-5, a QCI-6 or other QCIs, a MDN, an IMEI, a GPS-based timestamp, handoff information, or the like, from the eNB information, based on the preferences. In some implementations, server 260 may extract a QCI-1, a QCI-5, a QCI-6 or other QCIs, an IMSI, a MDN, an IMEI, a NTP-based timestamp, handoff information, an ID associated with MME 232, or the like, from the EPC network information, based on the preferences. In some implementations, server 260 may extract an IP address, an IMSI, a domain type, a caller ID number, identification of a terminating UE for the VoLTE call, identification of an originating UE for the VoLTE call, information indicating whether the VoLTE call is released by UE 210 or IMS network 240, a dialed number, or the like, from the IMS network information, based on the preferences.

In some implementations, server 260 may extract information associated with a RRC connection request and setup, information associated with a PDN connectivity attach request, or the like, from the PDN information, based on the preferences. In some implementations, server 260 may extract a start time and a release time associated with each device that handles the VoLTE call from the eNB information, the EPC network information, the IMS network information, and/or the PDN information. In some implementations, server 260 may consider the error codes mapping to be part of the particular information. The information received by server 260 and/or the particular information extracted from the received information, described herein, are examples of information that may be received and/or extracted by server 260. In some implementations, server 260 may receive and/or extract different information, additional information, or less information.

In some implementations, server 260 may receive the particular information specified by the preferences from devices of environment 200 that handle the VoLTE call. In such implementations, server 260 may not receive all of the eNB information, the EPC network information, the IMS network information, and/or the PDN information, but only the particular information provided by the eNB information, the EPC network information, the IMS network information, and/or the PDN information. Therefore, server 260 need not extract the particular information in such implementations.

As further shown in FIG. 4, process 400 may include combining the particular information into an end-to-end call record for the VoLTE call (block 440). For example, server 260 may combine the particular information into an end-to-end call record for the VoLTE call. In some implementations, server 260 may use the QCI-1, the QCI-5, the QCI-6 or other QCIs, the MDN, the IMEI, the GPS-based timestamp, the handoff information, or the like (e.g., received from eNB 222) for the end-to-end VoLTE call record. Alternatively, or additionally, server 260 may use the QCI-1, the QCI-5, the QCI-6, the IMSI, the MDN, the IMEI, the NTP-based timestamp, the handoff information, the ID associated with MME 232, or the like (e.g., received from MME 232, SGW 234, PCRF 236, and/or PGW 238) for the end-to-end VoLTE call record. Alternatively, or additionally, server 260 may use the IP address, the IMSI, the domain type, the caller ID number, the identification of a terminating UE for the VoLTE call, the identification of an originating UE for the VoLTE call, the information indicating whether the VoLTE call is released by UE 210 or IMS network 240, the dialed number, or the like (e.g., received from HSS 242, P-CSCF 244, and/or S-CSCF 246) for the end-to-end VoLTE call record.

Alternatively, or additionally, server 260 may use the information associated with the RRC connection request and setup, the information associated with the PDN connectivity attach request, or the like (e.g., received from PDN 250 and/or ePDG 252) for the end-to-end VoLTE call record. Alternatively, or additionally, server 260 may use the start time and the release time associated with each device that handles the VoLTE call (e.g., eNB 222, MME 232, SGW 234, PCRF 236, PGW 238, HSS 242, P-CSCF 244, S-CSCF 246, and/or ePDG 252) for the end-to-end VoLTE call record. Alternatively, or additionally, server 260 may use the error codes mapping for the end-to-end VoLTE call record.

In some implementations, the end-to-end VoLTE call record may be provided in a data structure (e.g., a database, a table, a list, a tree, or the like) that includes a network device field, a parameter field, a problem field, and/or an error code field. The network device field may identify devices of environment 200 from which information of the end-to-end VoLTE call record is received. The parameter field may include parameters (e.g., call setup information, QoS information, or the like) that are received from the devices identified in the network device field. The problem field may include problems associated with any of the parameters identified in the parameter field. The error code field may include error codes associated with the problems identified in the problem field.

As further shown in FIG. 4, process 400 may include outputting and/or storing the end-to-end call record to enable troubleshooting of the VoLTE call (block 450). For example, server 260 may output and/or store the end-to-end VoLTE call record to enable troubleshooting of the VoLTE call. In some implementations, server 260 may store the end-to-end VoLTE call record in a data structure provided in memory (e.g., memory 330 and/or storage component 340, FIG. 3). In some implementations, server 260 may display the data structure with the end-to-end VoLTE call record, via a user interface, to a user associated with server 260. In some implementations, server 260 may display portions of the end-to-end VoLTE call record via a user interface. For example, server 260 may display parameters of the end-to-end VoLTE call record that are experiencing problems, and may not display parameters of the end-to-end VoLTE call record that are not experiencing problems.

In some implementations, server 260 may generate a graphical representation of environment 200, and may associate the parameters of the end-to-end VoLTE call with the graphical representation of environment 200. For example, server 260 may display parameters associated with PGW 238 with a graphical representation of PGW 238, may display parameters associated with HSS 242 with a graphical representation of HSS 242, or the like. In another example, server 260 may provide an indication of parameters of the end-to-end VoLTE call record that are experiencing problems (e.g., via highlighting, blinking text, indicators, or the like) in the graphical representation of environment 200.

In some implementations, server 260 may provide notifications of problems associated with the end-to-end VoLTE call record to users (e.g., network administrators, network engineers, network maintenance personnel, or the like) associated with different devices of environment 200. For example, assume that a first user is responsible for maintaining eNB 222 and that a second user is responsible for maintaining MME 232. Further, assume that the end-to-end VoLTE call record indicates that eNB 222 and MME 232 experienced problems with the VoLTE call. In such an example, server 260 may provide the first user with a notification of the problem experienced by eNB 222 and may provide the second user with a notification of the problem experienced by MME 232. In some implementations, server 260 may provide the notifications to users via different notification methods. For example, server 260 may provide a notification about the end-to-end VoLTE call record via an email message (e.g., email the notification to "jsmith@web.com"), a text message (e.g., text the notification to "999-222-4567"), an instant message (e.g., instant message (IM) the notification to a particular IM user), a voicemail message (e.g., provide voicemail of notification to "555-444-2222"), or the like.

In some implementations, the notifications and/or the outputting of the end-to-end VoLTE call record may enable users (e.g., network administrators, network engineers, network maintenance personnel, or the like) associated with different devices of environment 200 to troubleshoot problems experienced during the VoLTE call. For example, the end-to-end VoLTE call record may permit quick and easy troubleshooting of the entire VoLTE call and may reduce the time and expense associated with troubleshooting.

In some implementations, server 260 may utilize the end-to-end VoLTE call record to automatically troubleshoot the VoLTE call and devices of environment 200 that handle the VoLTE call. For example, server 260 may analyze the end-to-end VoLTE call record, and may identify one or more problems (e.g., errors, packet delays, packet loss, unknown information, or the like) associated with the VoLTE call based on the analysis. In such an example, server 260 may also identify devices of environment 200 that are associated with the one or more problems. In some implementations, server 260 may automatically correct the one or more problems, or may notify an appropriate user if server 260 is unable to automatically correct a problem. For example, assume that server 260 identifies a packet delay between eNB 222 and MME 232 based on the analysis of the end-to-end VoLTE call record, and determines that the packet delay is due to heavy traffic handled by eNB 222. In such an example, server 260 may cause eNB 222 to provide future VoLTE calls to another eNB 222 that is not handling heavy traffic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
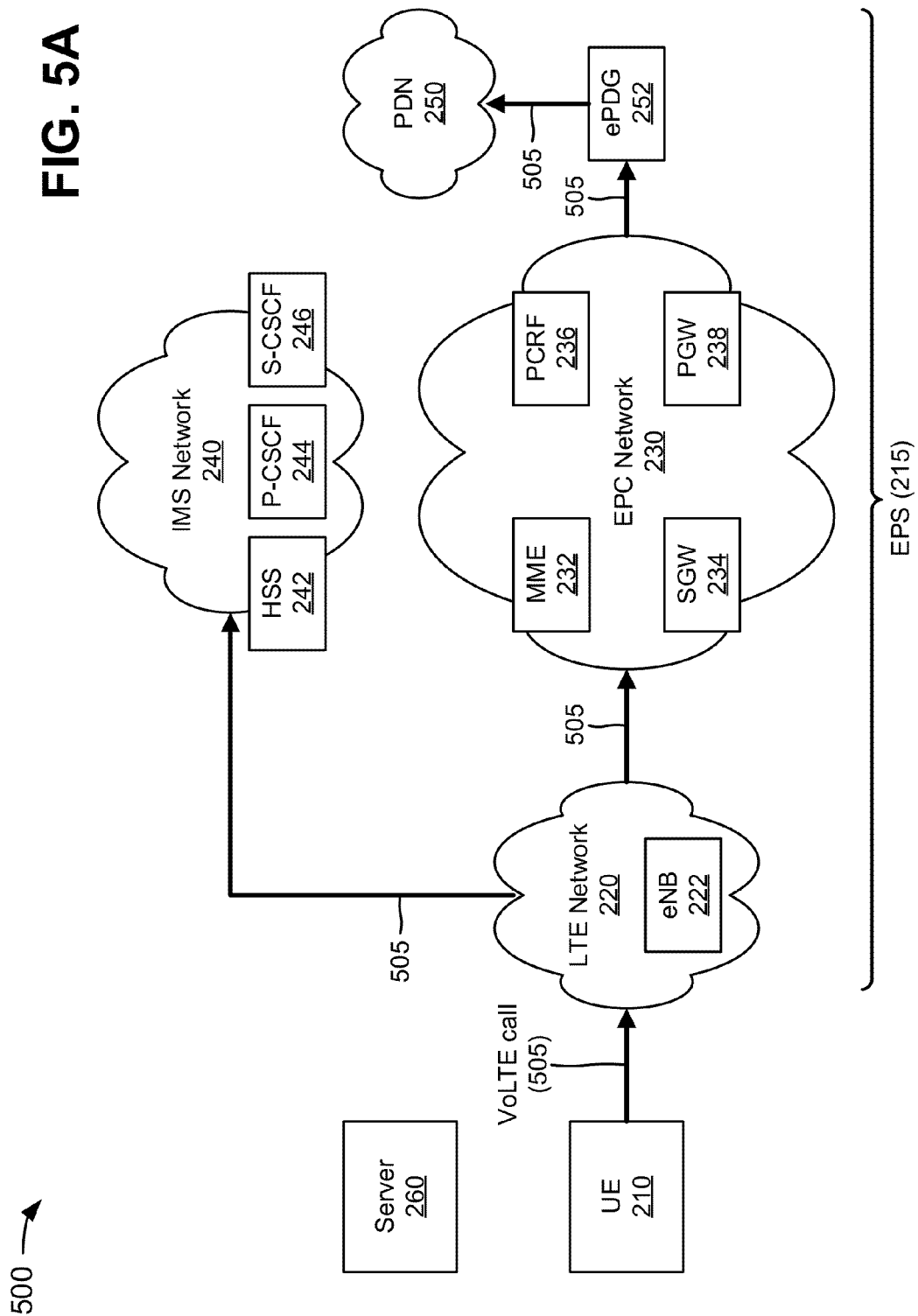

FIGS. 5A-5F are diagrams of an example 500 relating to example process 400 shown in FIG. 4. As shown in FIG. 5A, assume that UE 210 utilizes EPS 215 to establish and maintain a VoLTE call 505 with another UE. For example, UE 210 may start VoLTE call 505 by sending a RRC connection request message that includes information about what UE 210 wants (e.g., mobile originated signaling, emergency, or the like). If there is no problem in EPS 215, then eNB 222 may respond with a RRC connection setup message that includes signaling radio bearer information. After receiving the RRC connection setup message, UE 210 may respond with a RRC connection complete message, and may provide an attach request to EPC network 230. UE 210 may be authenticated before UE 210 may use any network resources. To begin the authentication process, EPC network 230 may send an authentication request message or a challenge to make sure that UE 210 is a valid entity. In response, UE 210 may send an authentication response.

After authentication, EPC network 230 may send a security mode command to UE 210, and, in response, UE 210 may send a security mode complete message. In order to protect EPS session management (ESM) information, EPC network 230 may send an ESM information request to UE 210. UE 210 may respond with an ESM information response that describes protected protocol configuration options. At this point, EPC network 230 may set up additional bearers to carry out VoLTE call 505. To establish an EPS bearer, EPC network 230 may send a radio bearer reconfiguration message to UE 210, and UE 210 may respond with a radio bearer reconfiguration complete message. Before sending SIP requests to IMS network 240, UE 210 may identify a correct P-CSCF 244 (e.g., via an IP multimedia services identity module (ISIM), via the connectivity request during the attach process, or via a domain name server (DNS) query). After UE 210 finishes the radio procedures and establishes radio bearers, UE 210 may perform a SIP registration with IMS network 240 for VoLTE call 505. If the SIP registration is successful, UE 210 may complete VoLTE call 505 with the other UE.

Figure 5B:
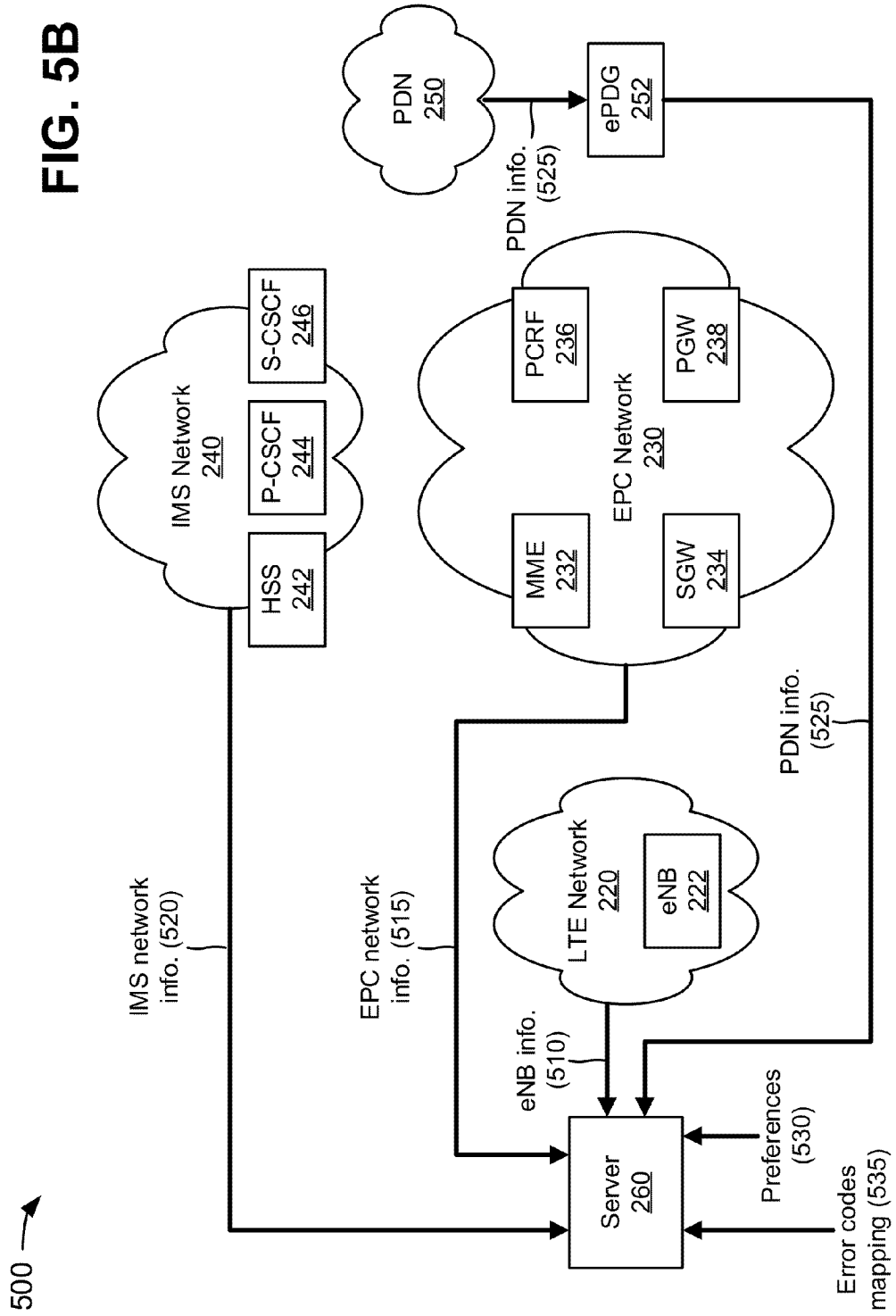

As shown in FIG. 5B, one or more devices of EPS 215 may generate information based on the establishment and maintenance of VoLTE call 505 for UE 210. For example, eNB 222 may generate eNB information 510 (e.g., call setup information, three-way conference call setup, or the like) based on the establishment and maintenance of VoLTE call 505. One or more devices of EPC network 230 (e.g., MME 232, SGW 234, PCRF 236, and/or PGW 238) may generate EPC network information 515 (e.g., call setup information, three-way conference call setup information, QoS information, call mobility information, or the like) based on the establishment and maintenance of VoLTE call 505. One or more devices of IMS network 240 (e.g., HSS 242, P-CSCF 244, and/or S-CSCF 246) may generate IMS network information 520 (e.g., call setup information, three-way conference call setup information, QoS information, call mobility information, or the like) based on the establishment and maintenance of VoLTE call 505. PDN 250 and/or ePDG 252 may generate PDN information 525 (e.g., protocol configuration options, connectivity information, or the like) based on the establishment and maintenance of VoLTE call 505.

As further shown in FIG. 5B, server 260 may receive eNB information 510, EPC network information 515, IMS network information 520, and/or PDN information 525. Server 260 may also receive preferences 530 and/or an error codes mapping 535 (e.g., from a user of server 260). Preferences 530 may indicate particular information (e.g., parameters, KPIs, or the like) to extract from eNB information 510, EPC network information 515, IMS network information 520, and/or PDN information 525. Error codes mapping 535 may provide an error code per device mapping (e.g., a list of codes that map to errors occurring in environment 200 during VoLTE call 505).

As shown in FIG. 5C, server 260 may include an extract information element 540 and a combine parameters element 545. Extract information element 540 may receive eNB information 510, EPC network information 515, IMS network information 520, PDN information 525, preferences 530, and error codes mapping 535. Extract information element 540 may extract particular information (e.g., extracted parameters 550) from eNB information 510, EPC network information 515, IMS network information 520, and/or PDN information 525, based on preferences 530. For example, preferences 530 may cause extract information element 540 to extract the following parameters: QCI-1, QCI-5, MDN, IMEI, a GPS-based timestamp, handoff information, IMSI, a NTP-based timestamp, a MME ID, an IP address, a domain type, a caller ID, identification of a terminating UE for VoLTE call 505, identification of an originating UE for VoLTE call 505, information indicating whether VoLTE call 505 is released by UE 210 or IMS network 240, a dialed number, a start time and a release time associated with each device that handles VoLTE call 505, or the like.

In some implementations, extract information element 540 may analyze eNB information 510, EPC network information 515, IMS network information 520, and/or PDN information 525 for particular keywords, fields, or the like, indicative of the particular information (e.g., extracted parameters 550) identified by preferences 530. Extract information element 540 may then extract or identify extracted parameters 550 based on the analysis. In some implementations, extract information element 540 may utilize custom templates (e.g., that match particular network devices, information patterns, manufacturers of the particular network devices, or the like) to analyze eNB information 510, EPC network information 515, IMS network information 520, and/or PDN information 525. In such implementations, the custom templates may enable extract information element 540 to know exactly where to search for the particular keywords, fields, or the like, indicative of the particular information (e.g., extracted parameters 550), for each network device type, network device manufacturer, or the like in eNB information 510, EPC network information 515, IMS network information 520, and/or PDN information 525.

Figure 5E:
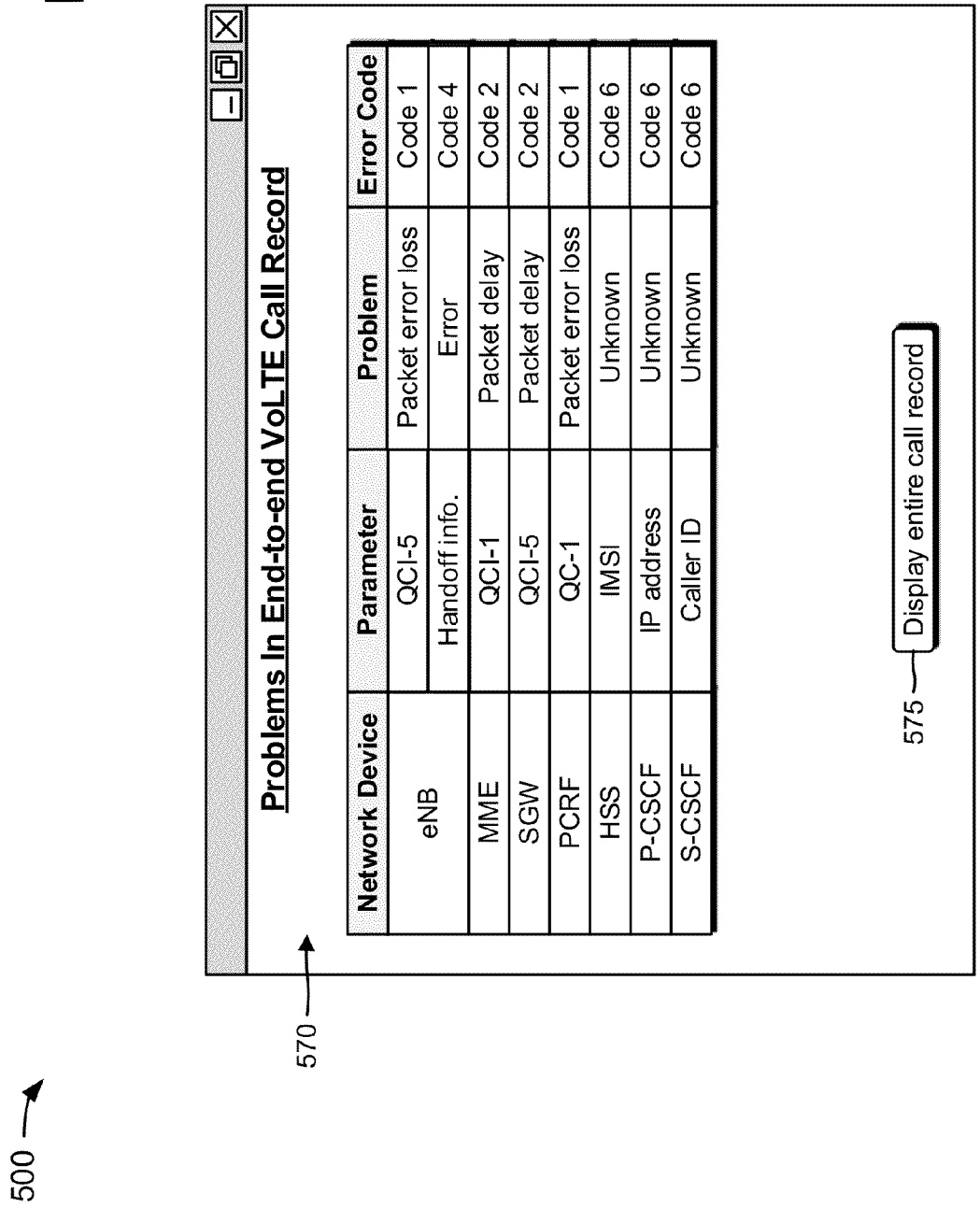
Figure 5F:
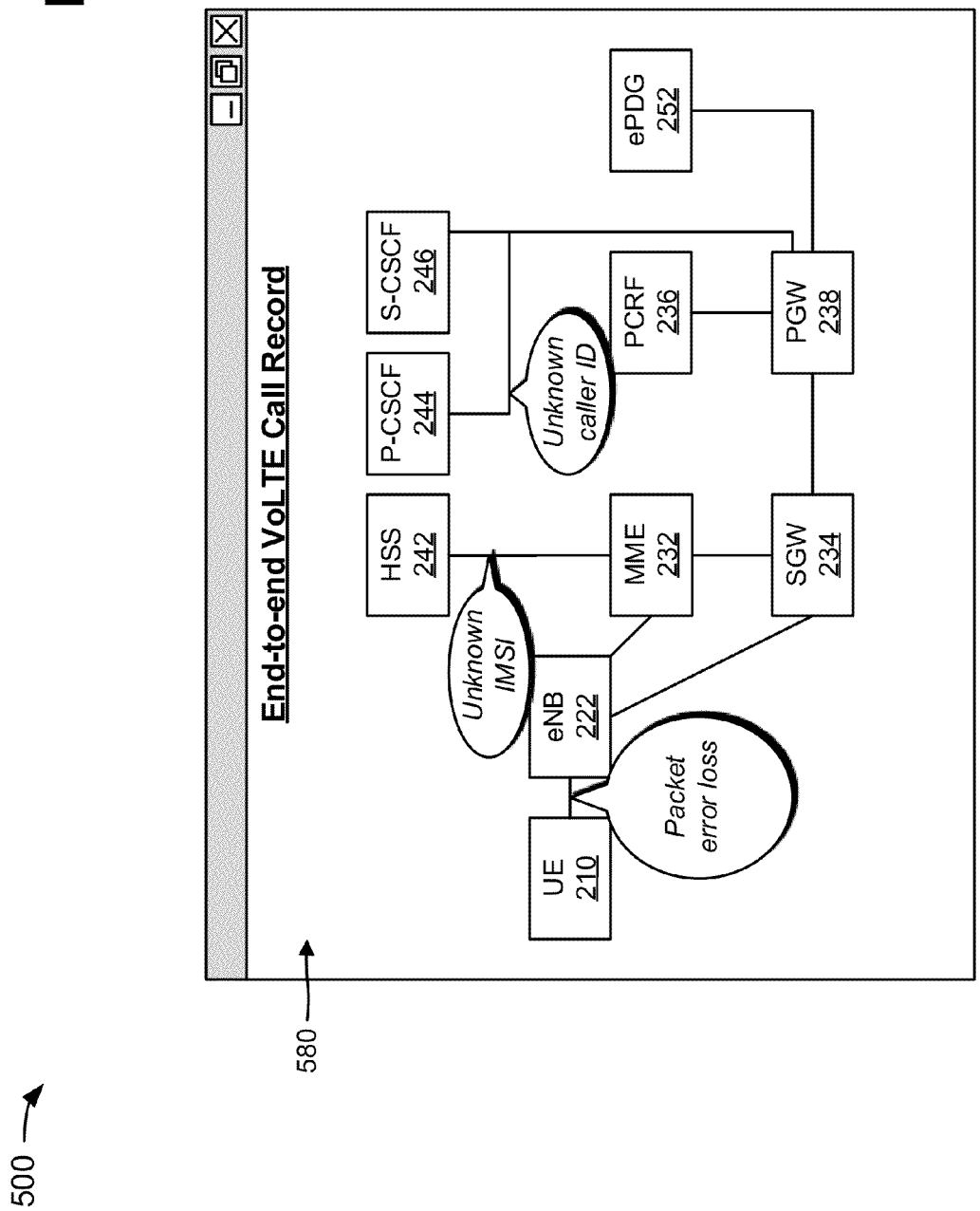

As further shown in FIG. 5C, combine parameters element 545 may receive extracted parameters 550 from extract information element 540, and may combine extracted parameters 550 into an end-to-end VoLTE call record 555. Combine parameters element 545 may cause server 260 to store end-to-end VoLTE call record 555 in memory (e.g., memory 330 and/or storage component 340, FIG. 3) associated with server 260. Combine parameters element 545 may cause server 260 to output (e.g., provide for display) end-to-end VoLTE call record 555 to a user associated with server 260, as shown in FIGS. 5D-5F.

As shown in FIG. 5D, server 260 may provide end-to-end VoLTE call record 555 for display via a user interface 560. User interface 560 may display end-to-end VoLTE call record 555 in a table that includes a network device field, a parameter field, a problem field, and an error code field. The network device field may identify devices of environment 200 from which information of end-to-end VoLTE call record 555 is received. For example, the network device field may indicate that information of end-to-end VoLTE call record 555 is received from eNB 222, MME 232, SGW 234, or the like.

The parameter field may identify parameters that are received from the devices identified in the network device field. For example, the parameter field may indicate that a QCI-1, a QCI-5, a MDN, an IMEI, a GPS-based timestamp, and handoff information are received from eNB 222 during VoLTE call 505. The parameter field may indicate that a MME ID, a NTP-based timestamp, and a QCI-1 are received from MME 232 during VoLTE call 505. The parameter field may also indicate that a QCI-5 is received from SGW 234 during VoLTE call 505.

The problem field may identify problems associated with any of the parameters identified in the parameter field. For example, the problem field may show that the QCI-5 associated with eNB 222 indicates a packet error loss, that the handoff information for eNB 222 indicates an error, and that other parameters associated with eNB 222 did not indicate problems during VoLTE call 505. The problem field may show that the QCI-1 associated with MME 232 indicates a packet delay, and that other parameters associated with MME 232 did not indicate problems during VoLTE call 505. The problem field may also show that the QCI-5 associated with SGW 234 indicates a packet delay.

The error code field may identify error codes associated with the problems identified in the problem field. For example, the error code field may indicate that a first error code (Code 1) is associated with the QCI-5 packet error loss for eNB 222, and that a fourth error code (Code 4) is associated with the handoff information error for eNB 222. The error code field may indicate that a second error code (Code 2) is associated with the QCI-1 packet delay for MME 232, and may indicate that the second error code is also associated with the QCI-5 packet delay for SGW 234.

As further shown in FIG. 5D, user interface 560 may include a selection mechanism 565 (e.g., a button, an icon, a link, or the like) that, when selected, causes server 260 to display only problems associated with end-to-end VoLTE call record 555. For example, selection mechanism 565, when selected, may cause server 260 to provide another user interface 570, as shown in FIG. 5E. User interface 570 may display problems associated with end-to-end VoLTE call record 555 in a table that includes the network device field, the parameter field, the problem field, and the error code field, as described above. The network device field may identify devices of environment 200 from which problems associated with end-to-end VoLTE call record 555 are received. For example, the network device field may indicate that problems associated with end-to-end VoLTE call record 555 are received from eNB 222, MME 232, SGW 234, PCRF 236, HSS 242, P-CSCF 244, and S-CSCF 246.

The parameter field may identify problem parameters that are received from the devices identified in the network device field. For example, the parameter field may show that problems, as indicated by a QCI-1 and handoff information, are received from eNB 222 during VoLTE call 505. The parameter field may also show that a problem, as indicated by a QCI-1, is received from MME 232 during VoLTE call 505; a problem, as indicated by a QCI-5, is received from SGW 234 during VoLTE call 505; a problem, as indicated by a QCI-1, is received from PCRF 236 during VoLTE call 505; a problem associated with an IMSI is received from HSS 242 during VoLTE call 505; a problem associated with an IP address is received from P-CSCF 244 during VoLTE call 505; and a problem associated with a caller ID is received from S-CSCF 246 during VoLTE call 505.

The problem field may identify problems associated with the parameters identified in the parameter field. For example, the problem field may show that the QCI-5 associated with eNB 222 indicates a packet error loss, and that the handoff information for eNB 222 experienced an error. The problem field may indicate that the QCI-1 associated with MME 232 indicates a packet delay, that the QCI-5 associated with SGW 234 indicates a packet delay, and that the QCI-1 associated with PCRF 236 indicates a packet error loss. The problem field may also indicate that the IMSI associated HSS 242 is unknown, that the IP address associated with P-CSCF 244 is unknown, and that the caller ID associated with S-CSCF 246 is unknown.

The error code field may identify error codes associated with the problems identified in the problem field. For example, the error code field may indicate that a first error code (Code 1) is associated with the QCI-5 packet error loss for eNB 222 and with the QCI-1 packet error loss for PCRF 236, and that a fourth error code (Code 4) is associated with the handoff information error for eNB 222. The error code field may indicate that a second error code (Code 2) is associated with the QCI-1 packet delay for MME 232 and with the QCI-5 packet delay for SGW 234. The error code field may indicate that a sixth error code (Code 6) is associated with the unknown IMSI for HSS 242, with the unknown IP address for P-CSCF 244, and with the unknown caller ID for S-CSCF 246. In some implementations, the error codes may be consistent across network devices so that it does not matter with which manufacturer a network device is associated.

As further shown in FIG. 5E, user interface 570 may include a selection mechanism 575 (e.g., a button, an icon, a link, or the like) that, when selected, causes server 260 to display the entire end-to-end VoLTE call record 555. For example, selection mechanism 575, when selected, may cause server 260 to provide user interface 560, as shown in FIG. 5D.

Alternatively, or additionally, server 260 may provide end-to-end VoLTE call record 555 for display via a user interface 580, as shown in FIG. 5F. User interface 580 may display end-to-end VoLTE call record 555 in a graphical representation of environment 200. For example, user interface 580 may include graphical representations of devices associated with VoLTE call 505, such as UE 210, eNB 222, MME 232, SGW 234, PCRF 236, PGW 238, HSS 242, P-CSCF 244, S-CSCF 246, and ePDG 252. User interface 580 may provide indications of problems associated with end-to-end VoLTE call record 555. For example, user interface 580 may indicate that a packet error loss occurred between UE 210 and eNB 222 during VoLTE call 505, that an unknown IMSI was provided by HSS 242 during VoLTE call 505, and that an unknown caller ID was provided by P-CSCF 244 during VoLTE call 505. In some implementations, user interface 580 may display parameters associated with a particular device when a user selects the particular device, may continuously display parameters associated with all of the devices, may display only problems encountered by particular devices, or the like.

In some implementations, server 260 may analyze end-to-end VoLTE call record 555, and may identify one or more problems associated with VoLTE call 505 based on the analysis. For example, server 260 may identify the packet error loss associated with eNB 222 (e.g., as indicated by the QCI-5 parameter). In some implementations, server 260 may automatically correct the one or more problems, or may notify an appropriate user if server 260 is unable to automatically correct a problem. For example, server 260 may determine that the packet error loss is due to an improper setting associated with eNB 222. In such an example, server 260 may instruct eNB 222 to change the improper setting to a proper setting, or may notify network maintenance personnel about the improper setting.

As indicated above, FIGS. 5A-5F are provided merely as an example. Other examples are possible and may differ from what was described with regard to FIGS. 5A-5F. In some implementations, the various operations described in connection with FIGS. 5A-5F may be performed automatically or at the request of a user.

Systems and/or methods, described herein, may collect performance information, associated with a VoLTE call, from network devices of a LTE network, an EPC network, an IMS network, and/or a packet data network that process the VoLTE call, and may generate an end-to-end VoLTE call record based on the performance information. The systems and/or methods may extract particular parameters from the performance information, and may create the end-to-end VoLTE call record based on the particular parameters. The systems and/or methods may correlate, in the end-to-end VoLTE call record, the performance information from network devices even when the network devices are manufactured by different vendors. The systems and/or methods may provide a unified end-to-end view of the VoLTE call that permits quick and easy troubleshooting of the entire VoLTE call and reduces the time and expense associated with troubleshooting.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, or the like). The user interfaces may receive user inputs via one or more input devices, may be user-configurable (e.g., a user may change the sizes of the user interfaces, information displayed in the user interfaces, color schemes used by the user interfaces, positions of text, images, icons, windows, or the like, in the user interfaces, or the like), and/or may not be user-configurable. Information associated with the user interfaces may be selected and/or manipulated by a user (e.g., via a touch screen display, a mouse, a keyboard, a keypad, voice commands, or the like). In some implementations, information provided by the user interfaces may include textual information and/or an audible form of the textual information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, information associated with a voice-over-long term evolution (VoLTE) call from a plurality of network devices that handle the voice-over-long term evolution call,
      the plurality of network devices being provided in an evolved packet system (EPS);
   identifying, by the device, particular parameters from the information associated with the voice-over-long term evolution call;
   combining, by the device, the particular parameters into an end-to-end call record for the voice-over-long term evolution call; and
   outputting or storing, by the device, the end-to-end call record for the voice-over-long term evolution call.

2. The method of claim 1, further comprising:
   receiving preferences associated with identifying the particular parameters from the information associated with the voice-over-long term evolution call; and
   identifying the particular parameters from the information associated with the voice-over-long term evolution call based on the preferences.

3. The method of claim 1, where the particular parameters include one or more of:
   call setup information associated with the voice-over-long term evolution call,
   quality of service (QoS) information associated with the voice-over-long term evolution call,
   call mobility information associated with the voice-over-long term evolution call,
   call origination information associated with the voice-over-long term evolution call,
   call termination information associated with the voice-over-long term evolution call, or
   timing information associated with the voice-over-long term evolution call.

4. The method of claim 1, where the particular parameters include one or more of:
   a quality of service (QoS) class indicator (QCI) associated with the voice-over-long term evolution call,
   a mobile directory number (MDN) associated with the voice-over-long term evolution call,
   an international mobile station equipment identity (IMEI) associated with the voice-over-long term evolution call,
   an international mobile subscriber identity (IMSI) associated with the voice-over-long term evolution call,
   an identifier associated with a mobility management entity (MME) of the plurality of network devices,
   an Internet protocol (IP) address associated with the voice-over-long term evolution call,
   a domain type associated with the voice-over-long term evolution call,
   a caller identification number associated with the voice-over-long term evolution call, or
   a dialed number associated with the voice-over-long term evolution call.

5. The method of claim 1, where the plurality of network devices include at least two of:
   one or more network devices associated with a long term evolution (LTE) network,
   one or more network devices associated with an evolved packet core (EPC) network,
   one or more network devices associated with an Internet protocol (IP) multimedia subsystem (IMS) network, or
   one or more devices associated with a packet data network (PDN).

6. The method of claim 1, where outputting or storing the end-to-end call record for the voice-over-long term evolution call comprises:
   providing, for display, the end-to-end call record for the voice-over-long term evolution call via a data structure that identifies:
      the plurality of network devices,
      the particular parameters, and
      one or more problems indicated by the particular parameters.

7. The method of claim 1, where outputting or storing the end-to-end call record for the voice-over-long term evolution call comprises:
   providing, for display, the end-to-end call record for the voice-over-long term evolution call via a graphical representation of the plurality of network devices, the particular parameters, and one or more problems indicated by the particular parameters.

8. A device, comprising:
   one or more processors to:
      receive information associated with a voice-over-long term evolution (VoLTE) call from a plurality of network devices that handle the voice-over-long term evolution call,
         the plurality of network devices being provided in an evolved packet system (EPS);
      identify particular parameters from the information associated with the voice-over-long term evolution call,
         at least one of the particular parameters corresponding to at least one error associated with the voice-over-long term evolution call;
      receive an error codes mapping that maps error codes to errors associated with the voice-over-long term evolution call;
      use the error codes mapping to identify at least one error code, of the error codes, that corresponds to the at least one error;
      combine the particular parameters and the at least one error code to form an end-to-end call record for the voice-over-long term evolution call; and
      output or store the end-to-end call record for the voice-over-long term evolution call.

9. The device of claim 8, where the one or more processors are further to:
   receive preferences associated with identifying the particular parameters from the information associated with the voice-over-long term evolution call; and
   identify the particular parameters from the information associated with the voice-over-long term evolution call based on the preferences.

10. The device of claim 8, where the one or more processors are further to:

analyze the end-to-end call record for the voice-over-long term evolution call; and identify at least one problem associated with at least one of the plurality of network devices based on the analyzing of the end-to-end call record.

11. The device of claim 10, where the one or more processors are further to one of:

cause the at least one of the plurality of network devices to correct the at least one problem; or generate a notification that identifies the at least one problem.

12. The device of claim 8, where, when outputting or storing the end-to-end call record for the voice-over-long term evolution call, the one or more processors are to:

provide, for display, the end-to-end call record for the voice-over-long term evolution call via a data structure that identifies:

the plurality of network devices, the particular parameters, one or more errors indicated by the particular parameters, and error codes associated with the one or more errors.

13. The device of claim 8, where, when outputting or storing the end-to-end call record for the voice-over-long term evolution call, the one or more processors are to:

provide, for display, the end-to-end call record for the voice-over-long term evolution call via a graphical representation of the plurality of network devices, the particular parameters, one or more errors indicated by the particular parameters, and error codes associated with the one or more errors.

14. The device of claim 8, where, when outputting or storing the end-to-end call record for the voice-over-long term evolution call, the one or more processors are to:

provide, for display, the end-to-end call record for the voice-over-long term evolution call via a data structure that identifies:

one or more of the plurality of network devices associated with one or more of the particular parameters indicating one or more errors, the one or more of the particular parameters indicating the one or more errors, the one or more errors, and error codes associated with the one or more errors.

15. A non-transitory computer-readable medium storing instructions, the instructions comprising:

one or more instructions that, when executed by one or more processors of a device, cause the one or more processors to:

receive information associated with a voice-over-long term evolution (VoLTE) call from a plurality of network devices that handle the voice-over-long term evolution call, the plurality of network devices being provided in an evolved packet system (EPS);

extract particular parameters from the information associated with the voice-over-long term evolution call;

combine the particular parameters into an end-to-end call record for the voice-over-long term evolution call; and output or store the end-to-end call record for the voice-over-long term evolution call.

16. The non-transitory computer-readable medium of claim 15, where the one or more instructions, when executed by the one or more processors, further cause the one or more processors to:

receive preferences associated with extracting the particular parameters from the information associated with the voice-over-long term evolution call; and extract the particular parameters from the information associated with the voice-over-long term evolution call based on the preferences.

17. The non-transitory computer-readable medium of claim 15, where the one or more instructions, when executed by the one or more processors, further cause the one or more processors to:

analyze the end-to-end call record for the voice-over-long term evolution call;

identify at least one problem associated with at least one of the plurality of network devices based on the analyzing of the end-to-end call record; and cause the at least one of the plurality of network devices to correct at least one problem.

18. The non-transitory computer-readable medium of claim 15, where the one or more instructions that cause the one or more processors to extract particular parameters from the information associated with the voice-over-long term evolution call cause the one or more processors to:

perform an analysis of the information associated with the voice-over-long term evolution call, based on custom templates, to identify the particular parameters; and extract the particular parameters from the information associated with the voice-over-long term evolution call based on the analysis.

19. The non-transitory computer-readable medium of claim 15, where the plurality of network devices includes at least two of:

one or more network devices associated with a long term evolution (LTE) network, one or more network devices associated with an evolved packet core (EPC) network, one or more network devices associated with an Internet protocol (IP) multimedia subsystem (IMS) network, or one or more devices associated with a packet data network (PDN).

20. The non-transitory computer-readable medium of claim 15, where the one or more instructions that cause the one or more processors to output or store the end-to-end call record for the voice-over-long term evolution call cause the one or more processors to:

provide, for display, the end-to-end call record for the voice-over-long term evolution call via a graphical representation of the plurality of network devices, the particular parameters, and one or more problems indicated by the particular parameters.

* * * * *